(12) United States Patent
Asakura et al.

(10) Patent No.: US 8,879,285 B2
(45) Date of Patent: Nov. 4, 2014

(54) POWER CONVERTER FOR OUTPUTTING POWER TO A SYSTEM

(75) Inventors: Fumio Asakura, Okazaki (JP); Kenji Ochi, Nishio (JP); Hiroshi Yoshida, Chiryu (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 366 days.

(21) Appl. No.: 13/364,482

(22) Filed: Feb. 2, 2012

(65) Prior Publication Data

US 2012/0201064 A1    Aug. 9, 2012

(30) Foreign Application Priority Data

Feb. 3, 2011   (JP) .................................. 2011-22062

(51) Int. Cl.
| | | |
|---|---|---|
| H02J 1/10 | (2006.01) | |
| H02M 7/5387 | (2007.01) | |

(52) U.S. Cl.
CPC ................................ H02M 7/53871 (2013.01)
USPC ................................ 363/65; 363/98; 363/132

(58) Field of Classification Search
USPC ............ 363/95, 97, 98, 123, 131, 132, 65, 89
See application file for complete search history.

(56) References Cited

U.S. PATENT DOCUMENTS

| | | | | |
|---|---|---|---|---|
| 8,559,202 B2 * | 10/2013 | Iwata et al. | ...................... | 363/71 |
| 8,670,249 B2 * | 3/2014 | Khajehoddin et al. | .......... | 363/39 |
| 2006/0145677 A1 * | 7/2006 | Okamura | ....................... | 323/283 |
| 2012/0087159 A1 * | 4/2012 | Chapman et al. | ............... | 363/41 |
| 2012/0155140 A1 * | 6/2012 | Chen et al. | ..................... | 363/132 |

FOREIGN PATENT DOCUMENTS

| | | | |
|---|---|---|---|
| JP | 2000-152647 | | 5/2000 |
| JP | 2000-333471 | | 11/2000 |
| JP | 2000-350467 | | 12/2000 |
| JP | 2001-8465 | | 1/2001 |
| JP | 2001-037246 | | 2/2001 |
| JP | 2001037246 A | * | 2/2001 |
| JP | 2007-097311 | | 4/2007 |
| JP | 2010-075022 | | 4/2010 |

OTHER PUBLICATIONS

Office Action (1 page) dated Jan. 22, 2013 issued in corresponding Japanese Application No. 2011-022062 and English translation (1 page).

* cited by examiner

*Primary Examiner* — Jue Zhang
*Assistant Examiner* — Lakaisha Jackson
(74) *Attorney, Agent, or Firm* — Nixon & Vanderhye PC

(57) ABSTRACT

A power converter includes a booster circuit, an inverter circuit, a hysteresis control circuit, and a proportional-integral control circuit. The booster circuit boosts DC power of a DC power source. The inverter circuit converts the DC power outputted from the booster circuit into AC power and outputs the AC power to a system. The hysteresis control circuit controls the inverter circuit by hysteresis control so that the AC power can be outputted to the system when an AC voltage of the system is less than a DC voltage of the power source. The proportional-integral control circuit controls the booster circuit by proportional-integral control so that the AC power can be outputted to the system when the AC voltage of the system is larger than the DC voltage of the power source.

8 Claims, 13 Drawing Sheets

POWER CONVERTER FOR OUTPUTTING POWER TO A SYSTEM

CROSS REFERENCE TO RELATED APPLICATION

This application is based on and claims priority to Japanese Patent Application No. 2011-22062 filed on Feb. 3, 2011, the contents of which are incorporated by reference.

FIELD

The present invention relates to a power converter for outputting power to a system.

BACKGROUND

A power converter for outputting power from a small power-generating facility or a small storage battery to a system is known. Such a power converter is called the "power conditioner" or "system-interconnected inverter". In this type of power converter, there is a need to reduce harmonics in AC power outputted to a system to maintain the quality of the AC power.

In apparatuses disclosed in JP-A-2000-152647, JP-A-2000-350467, JP-A-2000-333471, and JP-A-2001-8465, when an AC voltage of a system is lower than a DC voltage of a power source, only an inverter is driven, and when the AC voltage is higher than the DC voltage, only a booster circuit is driven. The booster circuit is controlled based on a current that flows through a reactor of the booster circuit.

In the conventional apparatuses, the booster circuit is controlled based on the reactor current. A current also flows from an input power source to an input-side smoothing capacitor. That is, the reactor current does not accurately reflect an output-side AC current. Therefore, it is difficult to reduce harmonic components in the AC output.

Further, in the conventional apparatuses, the AC current may be distorted when the control is switched between the inverter and the booster circuit. JP-A-2000-333471 discloses a technique for reducing the distortion. In the technique, the detected DC current value is corrected to correct the switching timing. However, the distortion is caused by a capacitive component and an inductive component in the circuit. Therefore, it is difficult to reduce the distortion to a sufficient level by using the technique.

SUMMARY

In view of the above, it is an object of the present invention to provide a power converter for reducing harmonics in an AC output and harmonics due to a transition between a DC-AC conversion by a booster circuit and a DC-AC conversion by an inverter circuit.

According to an aspect of the present invention, a power converter includes a booster circuit, an inverter circuit, a hysteresis control circuit, and a proportional-integral control circuit. The booster circuit boosts DC power of a DC power source. The inverter circuit converts the DC power outputted from the booster circuit into AC power and outputs the AC power to a system. The hysteresis control circuit controls the inverter circuit by hysteresis control so that the AC power is outputted to the system when an AC voltage of the system is less than a DC voltage of the power source. The proportional-integral control circuit controls the booster circuit by proportional-integral control so that the AC power is outputted to the system when the AC voltage of the system is larger than the DC voltage of the power source.

BRIEF DESCRIPTION OF THE DRAWINGS

The above and other objects, features, and effects will become more apparent from the following description and drawings in which like reference numerals depict like elements. In the drawings.

DETAILED DESCRIPTION OF THE PREFERRED EMBODIMENTS

First Embodiment

Figure 1:
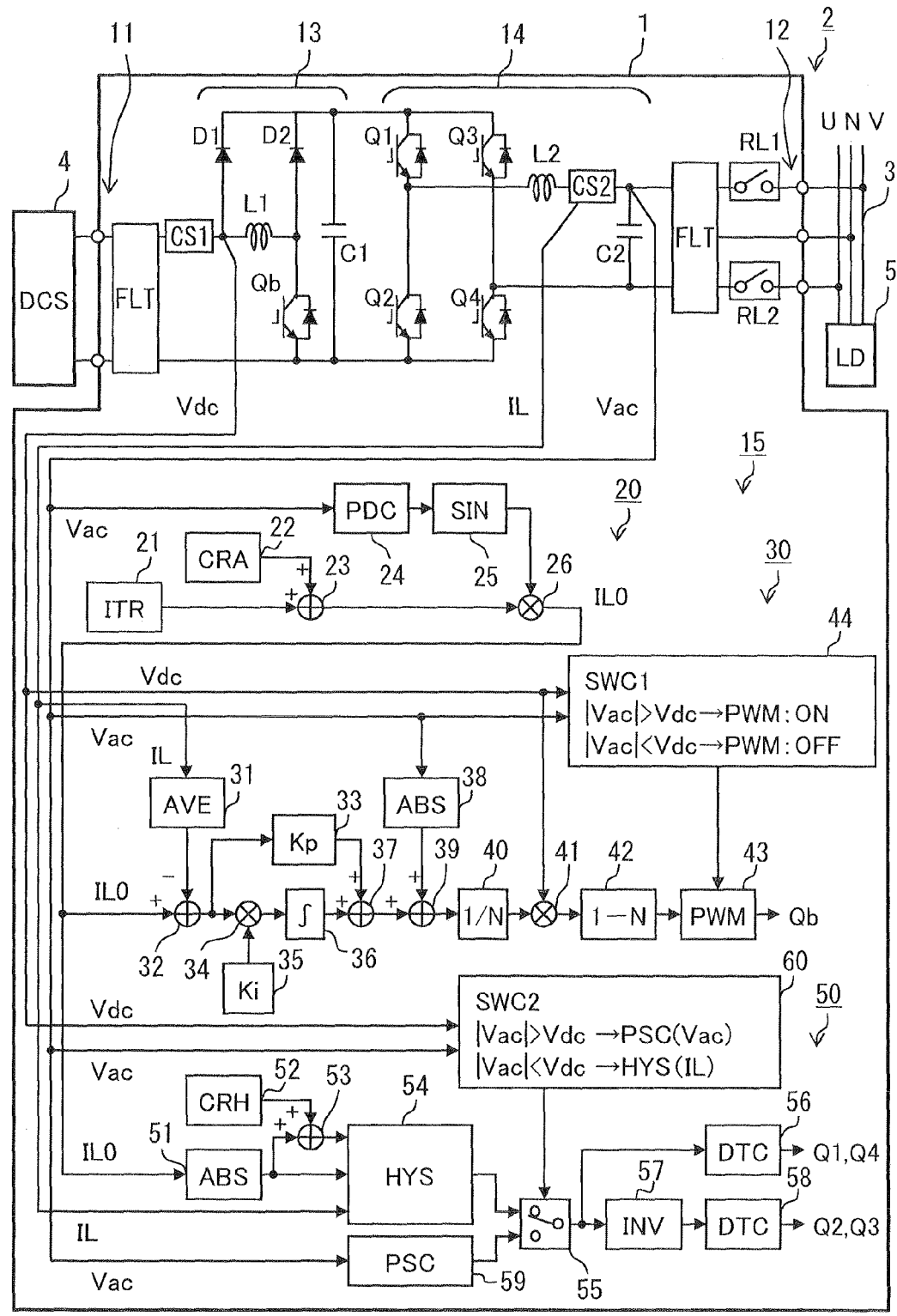
FIG. 1 is a block diagram of a power converter according to a first embodiment of the present invention.

FIG. 1 is a block diagram of a power system 2 including a power converter 1 according to a first embodiment of the present invention. The power system 2 is installed in a customer's installation connected to a system 3. For example, the power system 2 can be installed in an individual home or a business facility. The system 3 is a power network provided by a power supplier such as a power company. The system 3 is a single phase three wire system and has a neutral wire (N) and voltage wires (U, V). The power system 2 includes a small DC power source (DCS) 4. The DC power source 4 is a small power-generating facility or a small secondary (i.e., rechargeable) battery installed in the customer's installation. For example, the DC power source 4 can be a solar power generator, a wind power generator, or a fuel cell. The power system 2 includes an electrical load (LD) 5 that is supplied with power from the system 3. The power system 2 has a first function of receiving power from the system 3 and a second function of outputting power from the DC power source 4 to the system 3. The second function is sometimes called the "reverse power flow function". The power system 2 includes the power converter 1. The power converter 1 outputs power from the DC power source 4 to the system 3.

The power converter 1 includes a DC end 11 connected to the DC power source 4 and an AC end 12 connected to the system 3. The power converter 1 converts DC power, supplied from the DC end 11, into AC power and supplies the AC power to the system 3. The power converter 1 includes a booster circuit 13 and an inverter circuit 14.

The booster circuit 13 boosts DC power of the DC power source 4 and outputs the boosted DC power. Specifically, the booster circuit 13 is a converter circuit and boosts a DC voltage Vdc supplied from the DC end 11. For example, when a peak-to-peak voltage of the system 3 is 282 volts, the booster circuit 13 can output a voltage of 350 volts or more. The booster circuit 13 includes a reactor L1, a switching element Qb, diodes D1 and D2, and a smoothing capacitor C1. The switching element is an insulated gate bipolar transistor (IGBT). A first end of the reactor L1 is supplied with the DC voltage Vdc. A second end of the reactor L1 is connected between the diode D2 and the switching element Qb. The diode D2 and the switching element Qb are connected in series between booster outputs to provide an upper arm and a lower arm. The diode D1 is connected between the first end of the reactor L1 and the booster output. The diode D1 allows the DC voltage Vdc to be supplied directly to the booster output. The smoothing capacitor C1 is connected in parallel between the booster outputs. When the switching element Q performs a switching operation, the DC voltage Vdc is boosted and supplied to the booster output. In contrast, when the switching element Q does not perform the switching operation, the DC voltage Vdc is supplied directly to the booster output.

The inverter circuit 14 is connected between the booster circuit 13 and the AC end 12. The inverter circuit 14 converts DC power into AC power and outputs the AC power. Specifically, the inverter circuit 14 converts the voltage boosted by the booster circuit 13 or the DC voltage Vdc into AC voltage and supplies the AC voltage to the AC end 12. The inverter circuit 14 has a modulation function of modulating AC power outputted from the booster circuit 13 and a conversion function of converting DC power into AC power. The inverter circuit 14 outputs AC power to the system 3. The inverter circuit 14 includes a full-bridge circuit, a normal coil L2, and a smoothing capacitor C2. The full bridge circuit has at least four switching elements Q1, Q2, Q3, and Q4 that are connected in a full bridge configuration. Each of the switching elements Q1, Q2, Q3, and Q4 is an IGBT. Each of the switching elements Q1 and Q4 outputs a voltage having the same polarity as the DC voltage Vdc. The switching elements Q1 and Q4 are hereinafter sometimes called the "forward switch pair". In contrast, each of the switching elements Q2 and Q3 outputs a voltage having the opposite polarity to the DC voltage Vdc. The switching elements Q2 and Q3 are hereinafter sometimes called the "reverse switch pair". The normal coil L2 is connected between an AC end of the full bridge circuit and the system 3. The smoothing capacitor C2 is connected in parallel between the normal coil L2 and the AC end 12.

The power converter 1 includes first and second filter circuits FLT for removing noise. The first filter circuit FLT is connected between the DC end 11 and the booster circuit 13. The second filter circuit FLT is connected between the inverter circuit 14 and the AC end 12. The power converter 1 includes relays RL1 and RL2. The relays RL1 and RL2 are connected between the AC end 12 and the second filter circuit FLT to disconnect the power converter 1 from the system 3. The power converter 1 includes multiple sensors for detecting voltages and currents on various points of the power converter 1. The power converter 1 has a voltage sensor for detecting the DC voltage Vdc, a voltage sensor for detecting an AC voltage Vac, and a current sensor CS2 for detecting a current IL flowing through the normal coil L2. The power converter 1 can further include a current sensor CS1 for detecting a current supplied from the DC power source 4.

The power converter 1 includes a controller 15 for controlling the booster circuit 13 and the inverter circuit 14. The controller 15 includes a microcomputer with a computer-accessible storage media. The storage media stores a computer-readable program. The storage media is a memory device such as a read-only memory (ROM). The controller 15 executes the program so that the controller 15 can perform functions described later.

The controller 15 controls the booster circuit 13 and the inverter circuit 14 according to the current flowing through the normal coil L2 so that AC power in synchronization with AC power of the system 3 can be supplied to the system 3. The controller 15 controls switching of the booster circuit 13 and switching of the inverter circuit 14 so that a current having a smooth convex shaped waveform corresponding to a sinusoidal waveform can be generated. The controller 15 controls the booster circuit 13 in such a manner that the current IL flowing through the normal coil L2 can become equal to a target current IL0. As mentioned above, the current IL is detected by the current sensor CS2. Likewise, the controller 15 controls the inverter circuit 14 in such a manner that the current IL can become equal to the target current IL0.

The controller 15 controls the booster circuit 13 by a proportional integral (PI) control. Specifically, the controller 15 controls switching of the switching element Qb in such a manner that the current IL can become equal to the target current IL0. More specifically, a duty-ratio of the switching element Qb is adjusted based on a proportional component in proportional to a deviation between the current IL and the target current IL0 and an integral component that is an integral of the deviation.

The controller 15 controls the inverter circuit 14 by hysteresis control. Specifically, the controller 15 controls switching of the switching elements Q1-Q4 in such a manner that the current IL can become equal to the target current IL0. More specifically, the switching elements Q1-Q4 are switched in such a manner that the current IL can be kept within a range defined by a predetermined upper limit and a predetermined lower limit that are set based on the target current IL0.

The controller 15 includes a target setting block 20 for setting the target current IL0. The target setting block 20 includes an instruction block (ITR) 21 for setting an instruction current value, a correction block (CRA) 22 for setting a correction value, and an adder block 23 for adding the instruction current value and the correction value. For example, when the DC power source 4 is a solar battery, the instruction current value can be obtained by maximum power tracking control that changes the current value to maximize output power of the solar battery. For another example, when the DC power source 4 is a secondary battery, the instruction current value can be set to keep output power of the secondary battery constant. The correction value is set to compensate a current rise delay due to the reactor L1 of the booster circuit 13 and the smoothing capacitor C1. As mentioned above, the instruction current value and the correction value are added by the adder block 23.

The target setting block 20 includes a synchronous circuit for generating the target current I that is synchronized with a power waveform of the system 3. The synchronous circuit includes a phase-locked loop control block (PDC) 24, a sine-wave generator block (SIN) 25, and a multiplier block 26. The PDC 24 obtains the time and period of a zero-crossing of the AC voltage Vac of the system 3 by phase locked loop. The SIN 25 generates a sine-wave signal that is synchronized with the AC voltage Vac. The multiplier block 26 generates and outputs the target current IL0 by multiplying the corrected instruction current value and the sine-wave signal together.

The controller 15 includes a booster control block 30 for controlling the booster circuit 13 by proportional-integral (PI) control. The booster control block 30 includes a group of functional blocks 31-43 for achieving the PI control. A relationship between an input voltage Vin and an output voltage Vout of the booster circuit 13 is given by the following equation:

$$V\text{out} = T/(T - T\text{on}) \times V\text{in} \quad (1)$$

T represents a switching period of the switching element Qb. Ton represents ON-time of the switching element Qb. The above equation (1) can be rewritten as follows by substituting Ton/T=MR into the equation (1):

$$MR = 1 - (V\text{in}/V\text{out}) \quad (2)$$

The MR represents a modulation factor. The group of functional blocks 31-43 calculates the modulation factor MR and drives the switching element Qb by a duty signal that depends on the modulation factor.

The average block (AVE) 31 calculates an average of the current IL of the normal coil L2. The AVE 31 calculates an average of the current IL over a predetermined time period. In other words, the AVE 31 calculates a moving average of the current IL. Thus, noise components are reduced so that the booster circuit 13 can be controlled stably. As a result, the waveform of the alternating current can be almost equal to a sine wave. In this way, the AVE 31 can act as an average calculation circuit for calculating the moving average of the current IL of the normal coil L2.

The adder block 32 calculates a deviation between the target current IL0 and the average current. The deviation calculated by the adder block 32 corresponds to the deviation between the target current IL0 and the current IL. The proportional term block 33 calculates a proportional term for the PI control by multiplying the deviation, which is calculated by the adder block 32, by a predetermined proportional gain Kp. The integral term block 35 sets a predetermined integral gain Ki for the PI control. The multiplier block 34 multiplies the deviation, which is calculated by the adder block 32, by the integral gain Ki. An output of the multiplier block 34 is integrated by the integrator block 36 so that an integral term for the PI control can be calculated. The proportional term and the integral term are added by the adder block 37 so that a control value can be calculated.

The absolute-value block (ABS) 38 calculates an absolute value of the AC voltage Vac. The adder block 39 calculates an instruction voltage value by adding the absolute value of the AC voltage and the control value calculated by the adder block 37. The instruction voltage value corresponds to the output voltage Vout. The 1/N block 40, the multiplier block 41, and the (1−N) block 42 work in conjunction to calculate the modulation factor MR. The 1/N block 40 calculates the reciprocal of the instruction voltage value. The multiplier block 41 multiplies the reciprocal of the instruction voltage value by the DC voltage Vdc corresponding to the input voltage Vin. The (1−N) block 42 calculates the modulation factor MR. The modulation factor MR is inputted to the pulse-width modulation block (PWM) 43. The PWM 43 supplies the duty signal depending on the modulation factor MR to the switching element Qb.

Further, the booster control block 30 includes a first switch block (SWC1) 44 for controlling an execution time, during which the PI control is executed, based on a relationship between the DC voltage Vdc and the AC voltage Vac. When the absolute value of the AC voltage Vac is larger than the DC voltage Vdc (i.e., |Vac|>Vdc), the SWC1 44 turns ON the PWM 43 so that the booster circuit 13 can be PI-controlled. In contrast, when the absolute value of the AC voltage Vac is less than the DC voltage Vdc (i.e., |Vac|<Vdc), the SWC1 44 turns OFF the PWM 43 so that the booster circuit 13 cannot be PI-controlled. In this way, the SWC1 44 can act as a prevention circuit for preventing the booster circuit 13 to boost the DC voltage Vdc when |Vac|<Vdc. Thus, the booster circuit 13 boosts the DC voltage Vdc and supplies the boosted voltage only when |Vac|>Vdc. The DC voltage Vdc is supplied through the diode D1 to the output of the booster circuit 13, when |Vac|<Vdc. It is noted that when |Vac|=Vdc, the SWC1 44 can turn either ON or OFF the PWM 43. In this way, the booster control block 30 can act as a PI control circuit for controlling the booster circuit 13 by PI control in such a manner that the booster circuit 13 outputs AC power to the system 3 when the AC voltage Vac is larger than the DC voltage Vdc.

The controller 15 includes an inverter control block 50 for controlling the inverter circuit 14. The inverter control block 50 includes a group of functional blocks 51-58 for achieving the hysteresis control. The group of functional blocks 51-58 drives the switching elements Q1-Q4 of the inverter circuit 14 in such a manner that the current IL tracks the target current IL0. The absolute-value block (ABS) 51 calculates an absolute value of the target current IL0. The hysteresis width setting block (CRH) 52 sets a correction value corresponding to a hysteresis width that is set closer to the target current IL0. The adder block 53 calculates the upper limit for the hysteresis control by adding the absolute value of the target current IL0 and the correction value, which is set by the CRH 52, together. The hysteresis control block (HYS) 54 receives the current IL, the target current IL0, and the upper limit. The HYS 54 uses the target current IL0 as the lower limit. The HYS 54 outputs a first switching signal so that the current IL can be kept within the range defined by the upper limit and the lower limit. Specifically, each time the current IL reaches the upper limit or the lower limit, the HYS 54 outputs the first switching signal so that the forward switch pair of the switching elements Q1, Q4 and the reverse switch pair of the switching elements Q2, Q3 can be in opposite conditions. More specifically, when the current IL reaches the upper limit, the switching elements Q2 and Q3 are turned ON, and the switching elements Q1 and Q4 are turned OFF, in response to the first switching signal. In contrast, when the current IL reaches the lower limit, the switching elements Q1 and Q4 are turned ON, and the switching elements Q2 and Q3 are turned OFF, in response to the first switching signal. The group of functional blocks 51-58 and 60, which are associated with the HYS 54, can act as a hysteresis control circuit for controlling the inverter circuit 14 by hysteresis control so that DC power supplied from the booster circuit 13 can be modulated into a smooth sine wave of AC power.

The selector block 55 selects one of an output signal of the HYS 54 and an output signal of a polarity control block (PSC) 59. The PSC 59 is described later. The dead time adding block (DTC) 56 produces a first drive signal for the switching elements Q1 and Q4 by adding a predetermined dead time to an output signal of the selector block 55. The inversion block (INV) 57 inverts the polarity of the output signal of the selector block 55. The dead time adding block (DTC) 58 produces a second drive signal for the switching elements Q2 and Q3 by adding a predetermined dead time to an output signal of the INV 57.

The PSC 59 outputs a second switching signal that is inverted based on the polarity of the AC voltage Vac. Specifically, when the AC voltage Vac is zero or more, the PSC 59 outputs the second switching signal for turning ON the switching elements Q1 and Q4 and for turning OFF the switching elements Q2 and Q3. In contrast, when the AC voltage Vac is less than zero, the PSC 59 outputs the second switching signal for turning ON the switching elements Q2 and Q3 and for turning OFF the switching elements Q1 and Q4. The PSC 59 can act as a polarity control circuit for controlling the inverter circuit 14 in order only to convert the DC power boosted by the booster circuit 13 into AC power.

Further, the inverter control block 50 includes a second switch block (SWC2) 60 for controlling an execution time, during which the hysteresis control is executed, based on a relationship between the DC voltage Vdc and the AC voltage Vac. Further, the SWC2 can serve a switch for switching the inverter circuit 14 between a high-speed switching mode and a low-speed switching mode. In the high-speed switching mode, the inverter circuit 14 is hysteresis controlled. In the low-speed switching mode, the inverter circuit 14 is controller based on the polarity of the AC voltage Vac in order not to modulate the output of the booster circuit 13.

When the absolute value of the AC voltage Vac is larger than the DC voltage Vdc (i.e., |Vac|>Vdc), the SWC2 60 controls the selector block 55 so that the selector block 55 can select the PSC 59. That is, when |Vac|>Vdc, the SWC2 60 allows the inverter circuit 14 to be controlled by the second switching signal outputted by the PSC 59 and prevents the inverter circuit 14 from being controlled by the first switching signal outputted by the HYS 54. Thus, when |Vac|>Vdc, the inverter circuit 14 supplies the voltage, which is boosted by the booster circuit 13, to the system 3. That is, the inverter circuit 14 converts DC power, which is boosted by the booster circuit 13, into AC power and supplies the AC power to the system 3.

In contrast, when the absolute value of the AC voltage Vac is less than the DC voltage Vdc (i.e., |Vac|<Vdc), the SWC2 60 controls the selector block 55 so that the selector block 55 can select the HYS 54. That is, when |Vac|<Vdc, the SWC2 60 allows the inverter circuit 14 to be controlled by the first switching signal outputted by the HYS 54 and prevents the inverter circuit 14 from being controlled by the second switching signal outputted by the PSC 59. Thus, when |Vac|<Vdc, the inverter circuit 14 supplies the voltage, which is modulated by the hysteresis control, to the system 3. It is noted that when |Vac|=Vdc, the SWC2 60 can select either the HYS 54 or the PSC 59.

Figure 2:
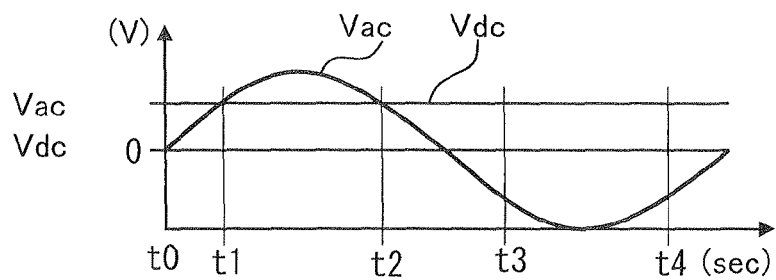
FIG. 2 is a diagram illustrating waveforms of a DC voltage and an AC voltage of the first embodiment.
Figure 3:
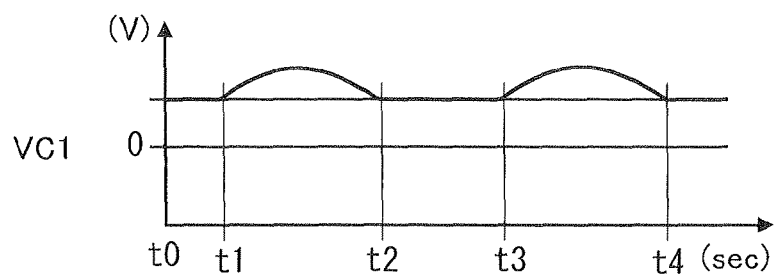
FIG. 3 is a diagram illustrating a waveform of a voltage of a smoothing capacitor of the first embodiment.
Figure 4:
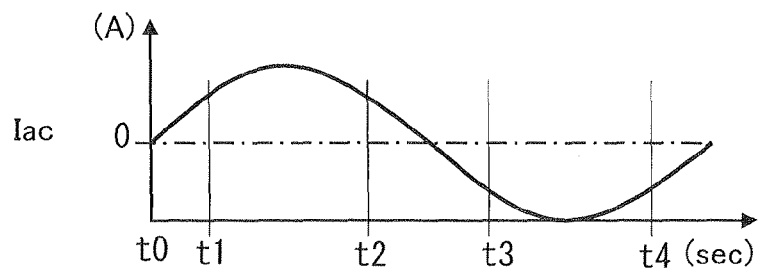
FIG. 4 is a diagram illustrating a waveform of a AC current of the first embodiment.
Figure 5:
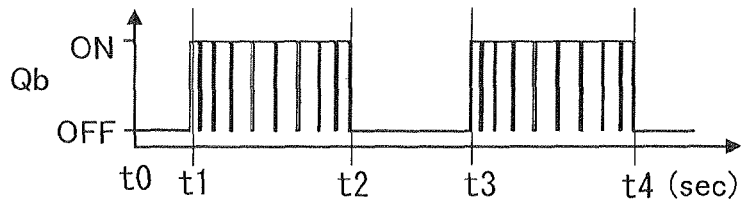
FIG. 5 is a diagram illustrating a waveform of a control signal for a booster circuit of the first embodiment.
Figure 6:
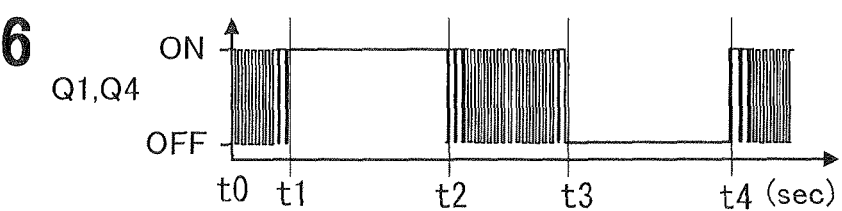
FIG. 6 is a diagram illustrating a waveform of a control signal for an inverter circuit of the first embodiment.
Figure 7:
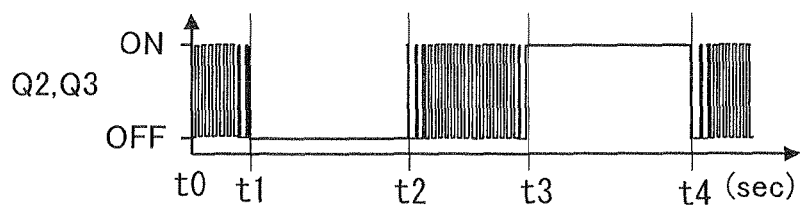
FIG. 7 is a diagram illustrating a waveform of a control signal for the inverter circuit of the first embodiment.

FIGS. 2-7 illustrate waveforms showing operations of the power converter 1 according to the first embodiment. FIG. 2 illustrates waveforms of the DC voltage Vc and the AC voltage Vac. FIG. 3 illustrates a voltage VC1 of the smoothing capacitor C1. FIG. 4 illustrates a waveform of an AC current Iac. FIG. 5 illustrates a control signal for the switching element Qb of the booster circuit 13. FIG. 6 illustrates a control signal for the switching elements Q1, Q4 of the inverter circuit 14. FIG. 7 illustrates a control signal for the switching elements Q2, Q3 of the inverter circuit 14.

The inverter circuit 14 performs the DC-AC conversion during a first period from t0 to t1 and a third period from t2 to t3, where the absolute value of the AC voltage Vac is less than the DC voltage Vdc. The booster control block 30 does not drive the booster circuit 13 during the first period and the third period. Therefore, the DC voltage Vdc is applied across the smoothing capacitor C1. The inverter circuit 14 is controlled by the first switching signal supplied from the HYS 54. The AC current Iac is controlled synchronously with the AC voltage Vac to form a sine wave.

The booster circuit 13 boosts the DC power during a second period from t1 to t2 and a fourth period from t3 to t4, where the absolute value of the AC voltage Vac is larger than the DC voltage Vdc. The booster circuit 13 is PI-controlled by the booster control block 30 during the second period and the fourth period. As a result, a voltage tracking the AC voltage Vac is applied across the smoothing capacitor C1. The inverter circuit 14 is controlled by the second switching signal supplied from the PSC 59 so that only the DC-AC conversion function of the inverter circuit 14 can be used. Therefore, the AC voltage boosted by the booster circuit 13 is supplied to the AC end 12. The AC current Iac is controlled synchronously with the AC voltage Vac to form a sine wave.

The polarity of the AC voltage Vac is positive during the second period from t1 to t2 and negative during the fourth period from t3 to t4. The switching condition of the inverter circuit 14 is inverted between the first period and the third period in accordance with the inversion of the polarity of the AC voltage Vac.

Figure 8:
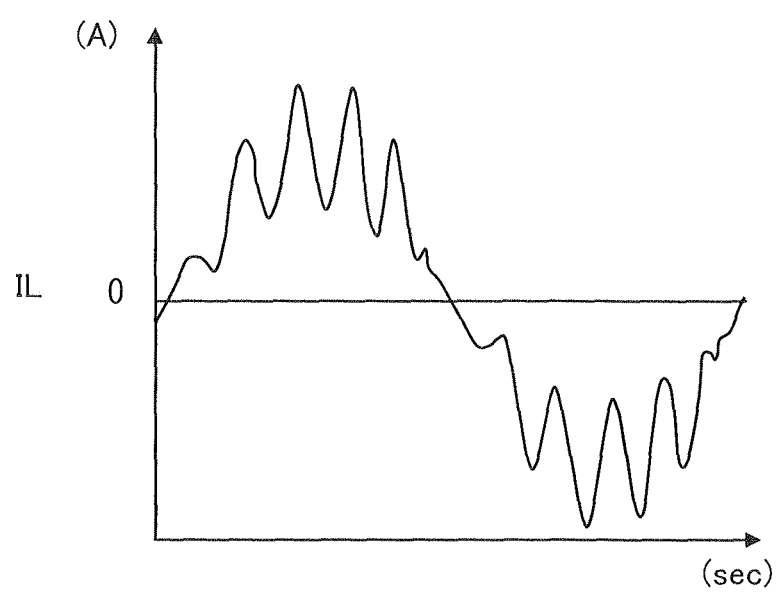
FIG. 8 is a diagram illustrating a waveform of a current flowing through a normal coil of the first embodiment.

FIG. 8 illustrates a waveform of the current IL of the normal coil L2. The current IL changes synchronously with the AC voltage Vac of the system 3 to form a sine wave. The current IL is distorted relatively largely during the periods where the booster circuit 13 is PI-controlled.

According to the first embodiment, when the AC voltage Vac is less than the DC voltage Vdc, the switching of the booster circuit 13 is stopped so that the modulation of the DC power and the DC-AC conversion can be performed by the hysteresis-controlled inverter circuit 14. In such an approach, the number of switching of the booster circuit 13 is reduced so that harmonics due to the booster circuit 13 can be reduced. Further, when the AC voltage Vac is less than the DC voltage Vdc, the number of switching of the hysteresis-controlled inverter circuit 14 is relatively small. Therefore, harmonics due to the inverter circuit 14 can be reduced.

When the AC voltage Vac is larger than the DC voltage Vdc, the DC power is boosted by the PI-controlled booster circuit 13, and the DC-AC conversion is performed by the inverter circuit 14, the polarity of which is controlled. At this time, only the DC-AC conversion function of the inverter circuit 14 is used so that the number of switching of the inverter circuit 14 can be reduced. Thus, the harmonics due to the inverter circuit 14 can be reduced.

Further, both the booster circuit 13 and the inverter circuit 14 are controlled based on the current IL flowing through the normal coil L2. That is, both the booster circuit 13 and the inverter circuit 14 are controlled based on the current IL flowing near the AC end 12 as an output terminal. Therefore, a current of substantially sinusoidal waveform can be supplied at the AC end 12.

Further, the PI control for controlling the booster circuit 13 is performed by using the moving average of the current IL. In such an approach, even when a variation in the current IL is large, the booster circuit 13 can be stably controlled by the PI control. Thus, the transition from the DC-AC conversion performed by the PI-controlled booster circuit 13 to the DC-AC conversion performed by the hysteresis-controlled inverter circuit 14 can be smoothed.

Second Embodiment

Figure 9:
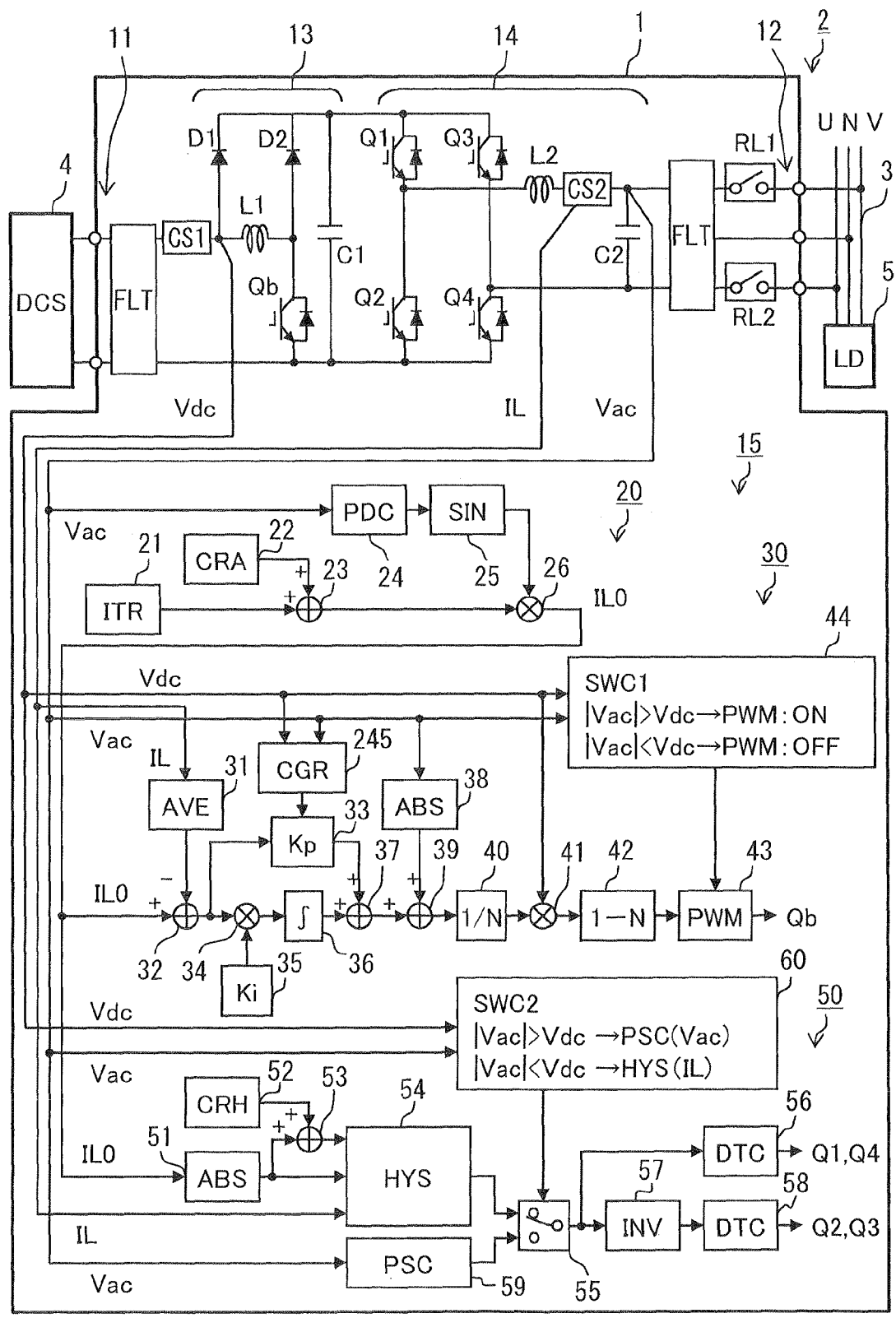
FIG. 9 is a block diagram of a power converter according to a second embodiment of the present invention.

A power converter 1 according to a second embodiment of the present invention is described below with reference FIG. 9. A difference between the first embodiment and the second embodiment is as follows. The power converter 1 according to the second embodiment further has a gain adjustment block (CGR) 245 for adjusting a control gain in the PI control. Specifically, the CGR 245 adjusts the proportional gain Kp so that the proportional gain Kp can be smaller for a predetermined period from the start of the PI control than for the other periods of the PI control. For example, the predetermined period can be a few milliseconds. The predetermined period can be set based on the resonance frequency between the capacitive component and the inductive component of the booster circuit 13. It is preferable that the predetermined period be over at least the resonance frequency. The predetermined period can be few cycles of the resonance frequency. For example, the predetermined period can be few cycles of a resonance frequency of a LC circuit constructed with the reactor L1 and the smoothing capacitor C1. The proportional gain Kp can be almost zero. The CGR 245 adjusts the proportional gain Kp so that the proportional gain Kp can gradually return to its original value after the predetermined time elapses. In this way, the CGR 245 can act as a control gain reduction circuit for reducing the control gain when the booster control block 30 starts to control the booster circuit 13.

Thus, the current flow through the reactor L1 and the smoothing capacitor C1 at the time of transition from the hysteresis control to the PI control is reduced. Therefore, the current distortion at the time of transition from the hysteresis control to the PI control is reduced.

Figure 10:
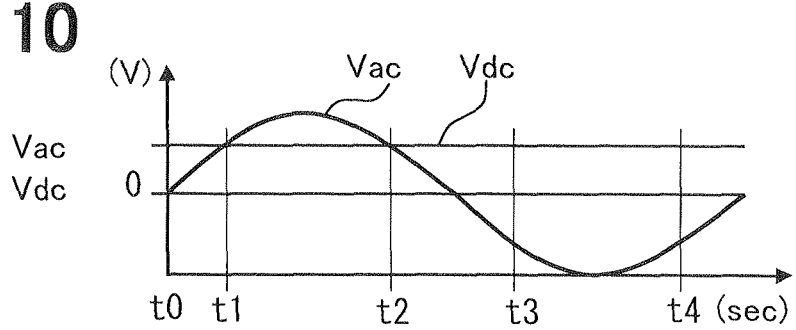
FIG. 10 is a diagram illustrating waveforms of a DC voltage and an AC voltage of the second embodiment.
Figure 11:
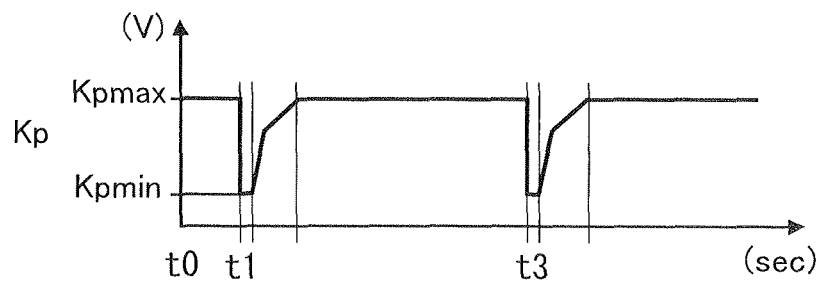
FIG. 11 is a diagram illustrating a waveform of a proportional gain of the second embodiment.

FIG. 10 illustrates waveforms of the DC voltage Vdc and the AC voltage Vac according to the second embodiment. FIG. 11 illustrates a waveform of the proportional gain Kp according to the second embodiment. As can be seen from FIG. 11, the CGR 245 changes the proportional gain Kp from a maximum value Kpmax to a minimum value Kpmin at a time t1 when the PI control is started. Thus, at the start of the PI control, the minimum value Kpmin, which is smaller than the maximum value Kpmax, is used. The proportional gain Kp is kept to the minimum value Kpmin for the predetermined period from the start of the PI control. After the predetermined time elapses, the proportional gain Kp is gradually increased from the minimum value Kpmin and returns to the maximum value Kpmax before the AC voltage Vac reaches its peak value. Thus, the control amount is reduced at the time of the PI control to reduce very sensitive control reaction. Further, a sufficient responsiveness can be provided in the later period of the PI control. Because of the reduction in the proportional gain Kp, the resonance component in the current IL is reduced accordingly.

Figure 12:
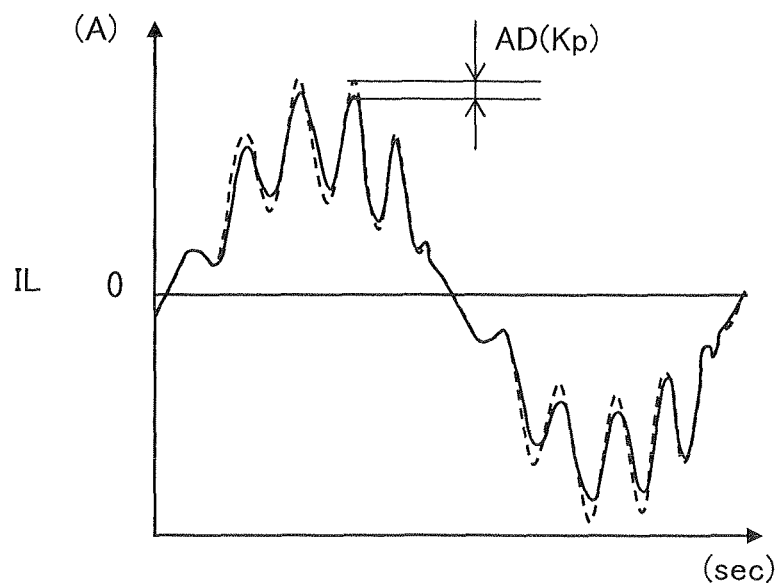
FIG. 12 is a diagram illustrating a waveform of a current flowing through a normal coil of the second embodiment.

FIG. 12 illustrates a waveform of the current IL of the normal coil L2. In FIG. 12, a broken line represents the power converter 1 with no CGR 245, and a solid line represents the power converter 1 with the CGR 245. That is, the broken line represents the first embodiment, and the solid line represents the second embodiment. As can be seen from FIG. 12, the amplitude of the resonance component in the current IL is reduced by a width AD (Kp).

Third Embodiment

Figure 13:
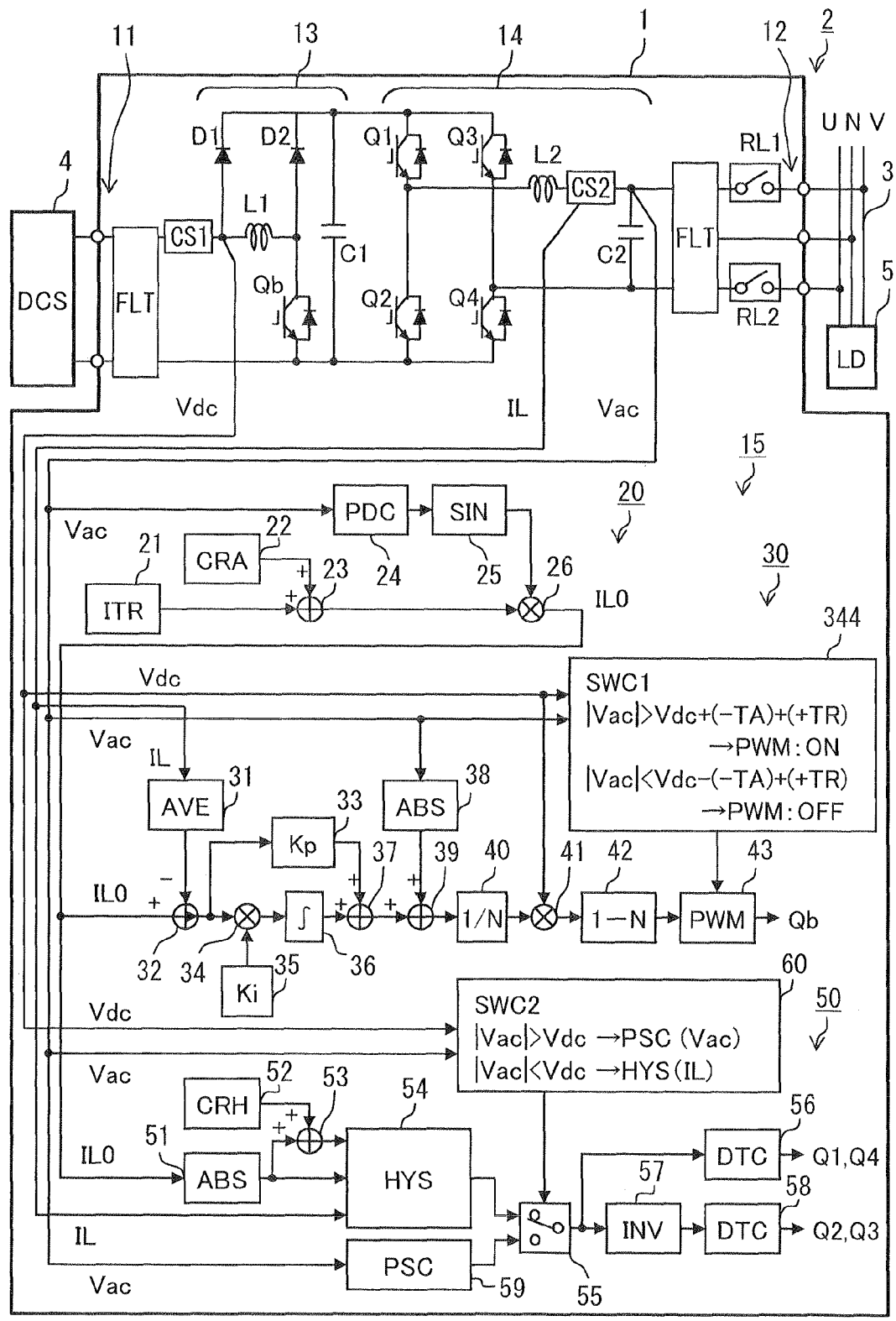
FIG. 13 is a block diagram of a power converter according to a third embodiment of the present invention.

FIG. 13 is a block diagram of a power converter 1 according to a third embodiment of the present invention. In the preceding embodiments, when Vac<Vdc, the DC power supplied through the diode D1 is converted into the AC power by the inverter circuit 14. Therefore, when Vac<Vdc, i.e., when the booster circuit 13 stops the boost function, no current flows through the diode D2. The diode D2 is an element for supplying the boosted DC power when the booster circuit 13 performs the boost function. In this configuration, the responsiveness may be insufficient in the early period of the PI control. To overcome this disadvantage, in the third embodiment, when the AC voltage Vac is larger than the DC voltage Vdc, a first switch block (SWC1) 344 advances an activation timing (i.e., advance angle) ts, at which the PI control of the booster circuit 13 is activated, by a predetermined advance time TA. Further, when the AC voltage Vac is smaller than the DC voltage Vdc, the SWC1 344 delays a deactivation timing, at which the PI control of the booster circuit 13 is deactivated, by a predetermined delay time (i.e., delay angle) TR.

Figure 14:
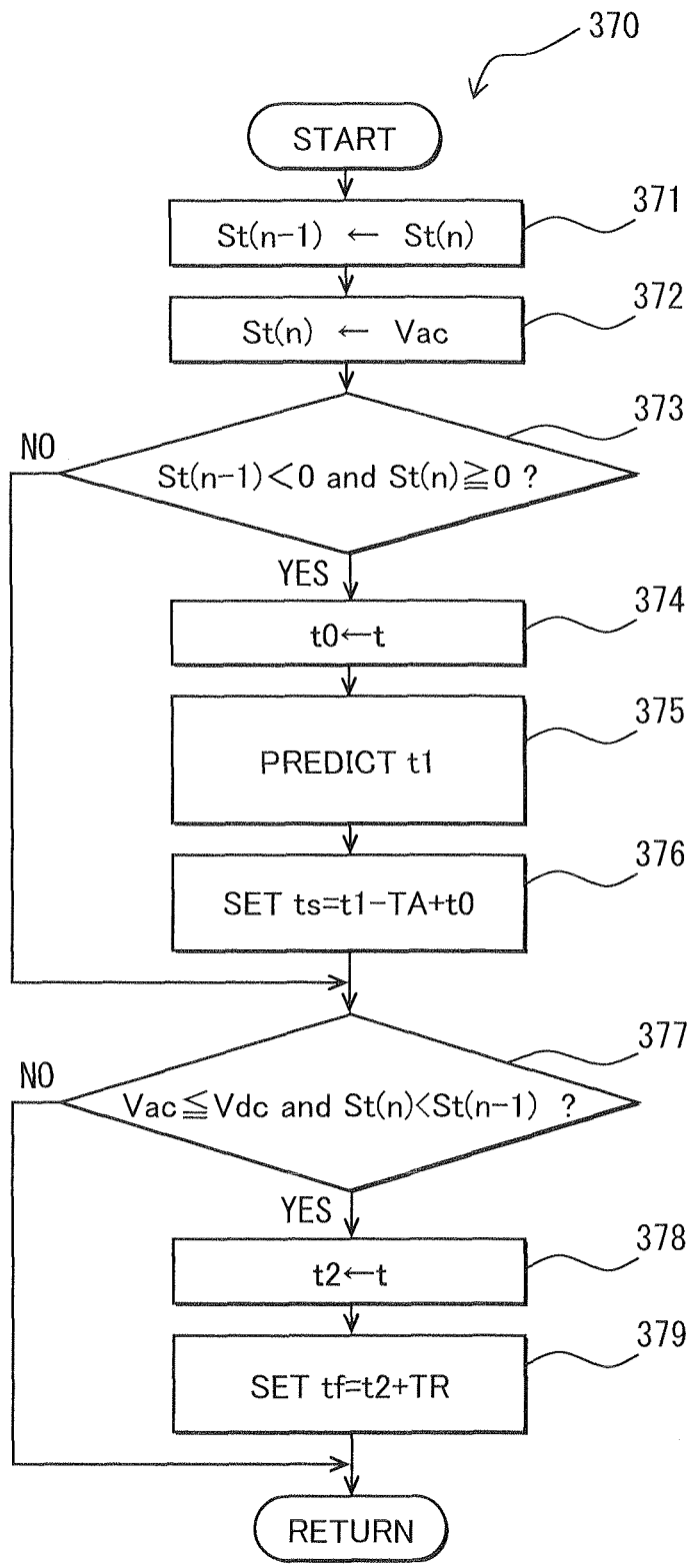
FIG. 14 is a flow chart of the power converter of the third embodiment.

FIG. 14 is a flow chart of a setting process 370 for setting the activation timing ts and the deactivation timing tf of the booster circuit 13.

The setting process 370 starts at step 371, where a sample value St(n) in the previous process is stored as a previous sample value St(n−1). Then, at step 372, the present AC voltage Vac is stored as the present sample value St(n). Then, at step 373, it is determined whether a first condition below is satisfied: the previous sample value St(n−1) is less than zero (i.e., St(n−1)<0) and the present sample value St(n) is zero or more (i.e., St(n−1) 0). If the first condition is not satisfied corresponding to NO at step 373, the setting process 370 jumps to step 377. In contrast, if the first condition is satisfied corresponding to YES at step 373, the setting process 370 proceeds to step 374. At step 374, the present time t is set to t0. Steps 371-374 serves as a detection process for detecting a time at which zero-crossing of the increasing AC voltage Vac occurs.

Figure 15:
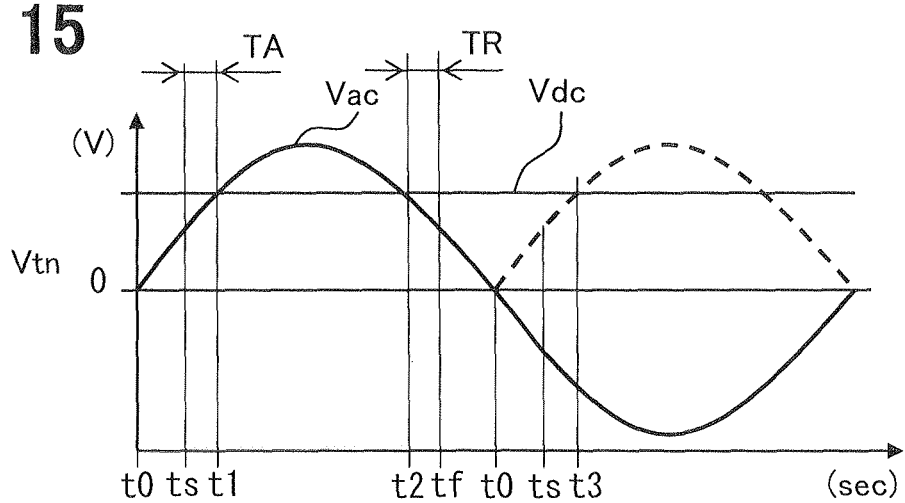
FIG. 15 is a diagram illustrating a sine wave table of the third embodiment.

Then, at step 375, a time t1, when the Ac voltage Vac becomes equal to the DC voltage Vdc, is predicted. The time t1 is predicted from a sine wave table shown in FIG. 15. Then, at step 376, the activation timing ts for the PU control of the booster circuit 13 is set. The activation timing ts is given as follows: ts=t1−TA+t0. When the activation timing ts arrives, the SWC1 344 turns ON the PWM 43 so that the booster circuit 13 can be PI-controlled. The SWC1 344 and steps 371-376 can act as a timing advance circuit for advancing the activation timing ts.

At step 377, a time t2, when the decreasing AC voltage Vac becomes equal to the DC voltage Vdc, is detected. Then, at step 377, it is determined whether a second condition below is satisfied: the AC voltage Vac is equal to or less than the DC voltage Vdc (i.e., Vac≤Vdc) and the present sample value St(n) is less than the previous sample value St(n−1) (i.e., St(n)<St(n−1)). If the second condition is not satisfied corresponding to NO at step 377, the setting process 370 returns to step 371. In contrast, if the second condition is satisfied corresponding to YES at step 377, the setting process 370 proceeds to step 378. At step 378, the present time t is set to t2.

At step 379, the deactivation timing tf for the PU control of the booster circuit 13 is set. The deactivation timing tf is given as follows: tf=t2+TR. When the activation timing tf arrives, the SWC1 344 turns OFF the PWM 43 so that the booster circuit 13 cannot be PI-controlled. The SWC1 344 and steps 371-379 can act as a timing delay circuit for delaying the deactivation timing tf.

Figure 16:
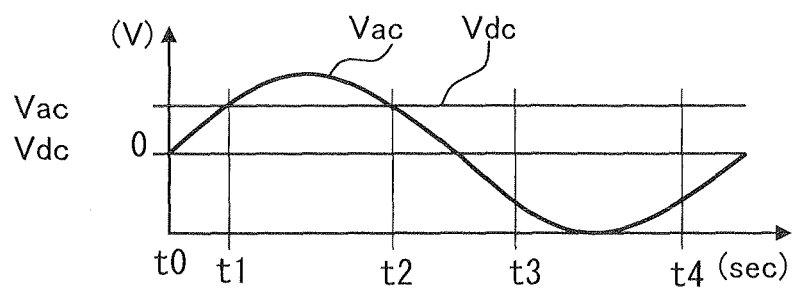
FIG. 16 is a diagram illustrating waveforms of a DC voltage and an AC voltage of the third embodiment.
Figure 17:
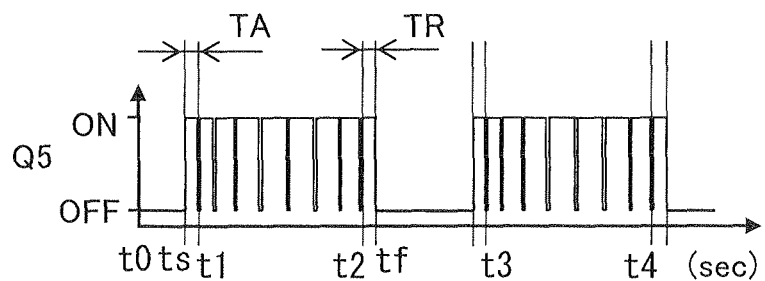
FIG. 17 is a diagram illustrating a waveform of a control signal for a booster circuit of the third embodiment.
Figure 18:
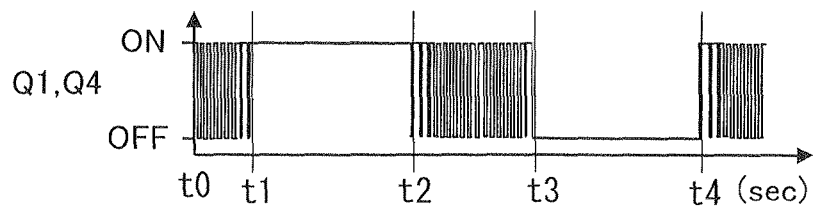
FIG. 18 is a diagram illustrating a waveform of a control signal for an inverter circuit of the third embodiment.
Figure 19:
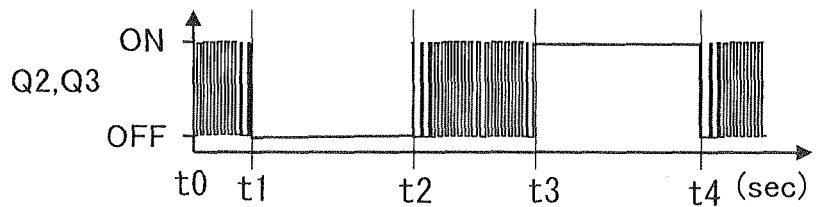
FIG. 19 is a diagram illustrating a waveform of a control signal for the inverter circuit of the third embodiment.

FIG. 16 illustrates waveforms of the DC voltage Vdc and the AC voltage Vac according to the third embodiment. FIG. 17 illustrates a waveform of a control signal for the booster circuit 13 according to the third embodiment. FIG. 18 illustrates a waveform of a control signal for the inverter circuit 14 according to the third embodiment. FIG. 19 illustrates a waveform of a control signal for the inverter circuit 14 according to the third embodiment.

The SWC1 344 keeps the PWM 43 OFF by the time ts, which is earlier than the time t1 by the advance time TA. The time t1 is a time when the absolute value of the AC voltage Vac exceeds the DC voltage Vdc. The SWC1 344 turns ON the PWM 43 at the time ts. In the period from the time ts to the time t1, the inverter circuit 14 is hysteresis-controlled to perform the DC-AC conversion. Therefore, in the period from the time ts to the time t1, the DC-AC conversion is performed by both the booster circuit 13 and the inverter circuit 14.

The SWC1 344 keeps the PWM 43 ON during the period from the time t1 to the time t2 where the absolute value of the AC voltage Vac is larger than the DC voltage Vdc (i.e., |Vac|>Vdc). During this period, the inverter circuit 14 is in the low-speed switching mode and does not perform the DC-AC conversion. Therefore, during this period, the DC-AC conversion is performed by only the inverter circuit 14.

Further, the SWC1 344 keeps the PWM 43 ON by the time tf, which is later than the time t2 by the delay time TR. The time t2 is a time when the absolute value of the AC voltage Vac decreases below the DC voltage Vdc. The SWC1 344 turns OFF the PWM 43 at the time tf. In the period from the time t2 to the time tf, the inverter circuit 14 is hysteresis-controlled to perform the DC-AC conversion. Therefore, in the period from the time t2 to the time tf, the DC-AC conversion is performed by both the booster circuit 13 and the inverter circuit 14.

Figure 20:
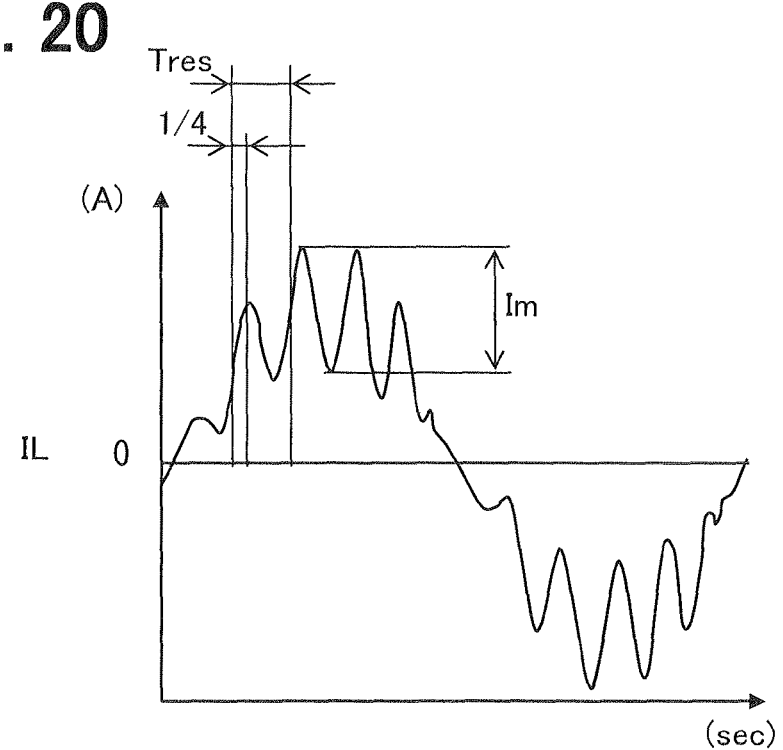
FIG. 20 is a diagram illustrating a waveform of a resonance component of the third embodiment.
Figure 21:
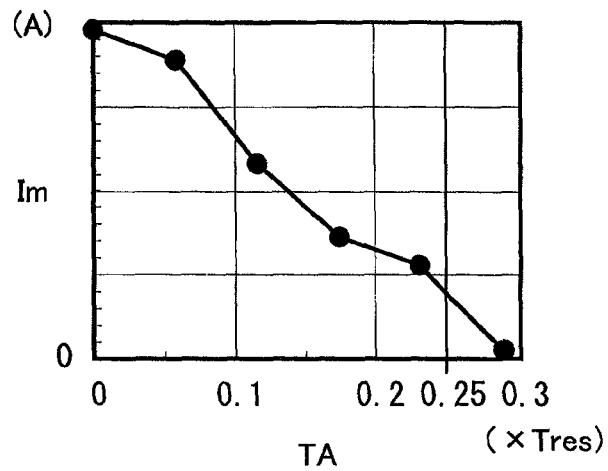
FIG. 21 is a diagram illustrating a relationship between an advance time and a current variation of the third embodiment.

FIG. 20 illustrates a waveform of a resonance component according to the third embodiment. FIG. 21 illustrates a relationship between the advance time TA and a current variation Im. The resonance component due to resonance between the capacitive component and the inductive component of the booster circuit 13 appears in the current IL flowing through the normal coil L2. The resonance component has a frequency Tres. Further, the current variation Im due to the resonance component appears in the current IL. The current variation varies depending on the advance time TA. When the advance time TA is in a range from 0.1×Tres to 0.3×Tres, the current variation Im decreases almost uniformly with an increase in the advance time TA. For example, when the advance time TA is set based on the resonance frequency Tres, the advance time TA can be equal to or larger than one-tenth of the resonance frequency Tres. It is preferable that the advance time TA be equal to or larger than one-tenth of the resonance frequency Tres and equal to or less than the resonance frequency Tres. Alternatively, the advance time TA can be set by taking into consideration trade-off with conversion efficiency. In this case, for example, the advance time TA can be about one-fourth of the resonance frequency Tres. The delay time TR can be set in the same manner as the advance time TA.

Figure 22:
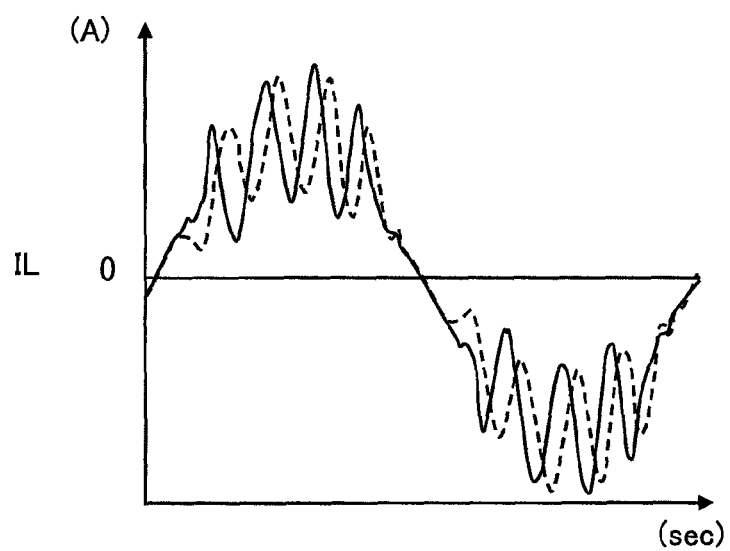
FIG. 22 is a diagram illustrating a waveform of a current flowing through a normal coil of the third embodiment.

FIG. 22 illustrates a waveform of the current IL of the normal coil L2. In FIG. 22, a broken line represents the power converter 1 in which the advance time TA and the delay time TR are not set, and a solid line represents the power converter 1 according to the third embodiment. As can be seen from FIG. 22, according to the third embodiment, a delay due to the resonance component in the current IL is reduced.

In this configuration, the responsiveness can be sufficient even in the early period of the PI control. Thus, the harmonics due to the transition from the hysteresis control to the PI control is reduced. Further, the harmonics due to the transition from the PI control to the hysteresis control is reduced.

Fourth Embodiment

Figure 23:
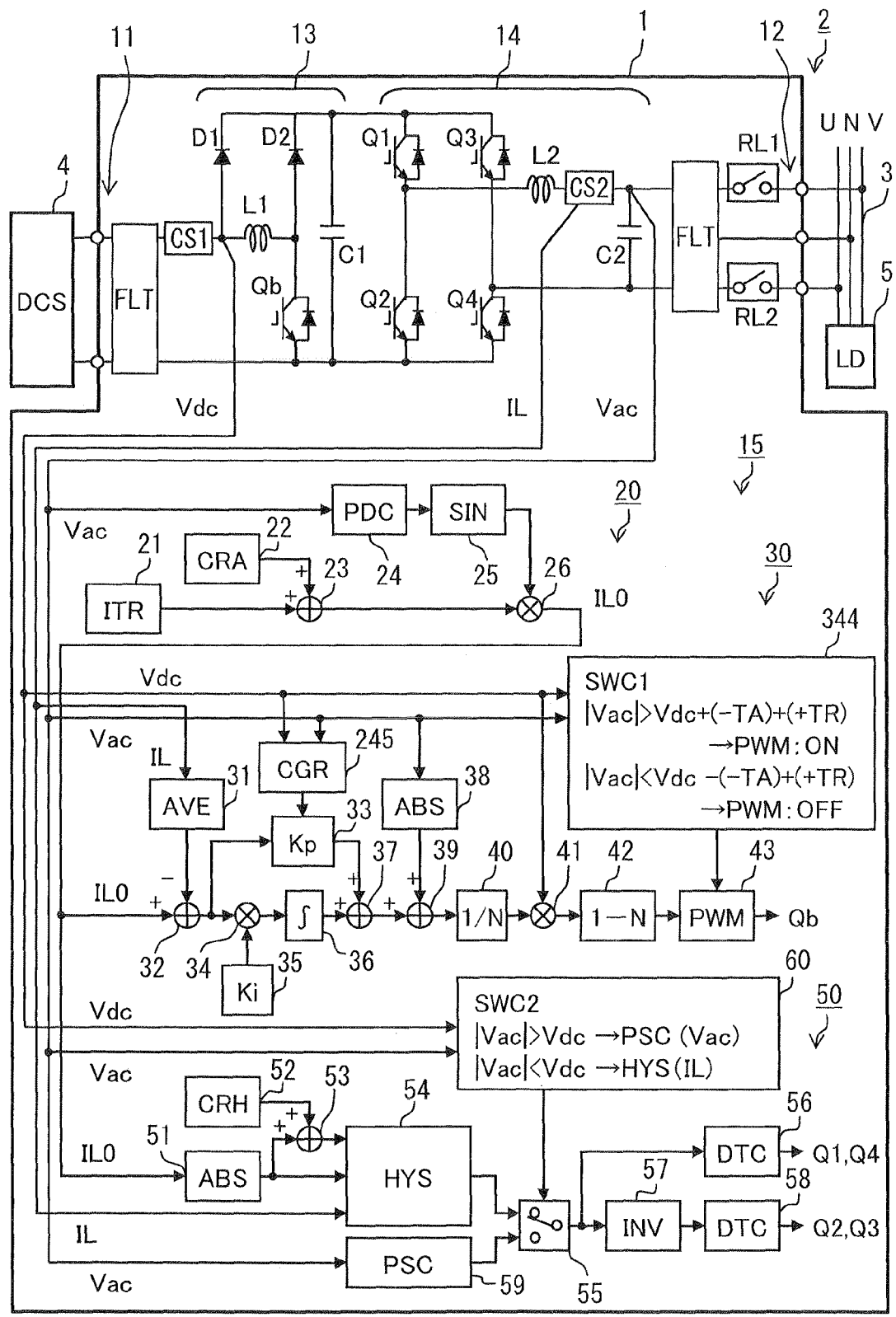
FIG. 23 is a block diagram of a power converter according to a fourth embodiment of the present invention.

FIG. 23 is a block diagram of a power converter 1 according to a fourth embodiment of the present invention. According to the fourth embodiment, the power converter 1 includes both the CGR 245 and the SWC1 344.

Figure 24:
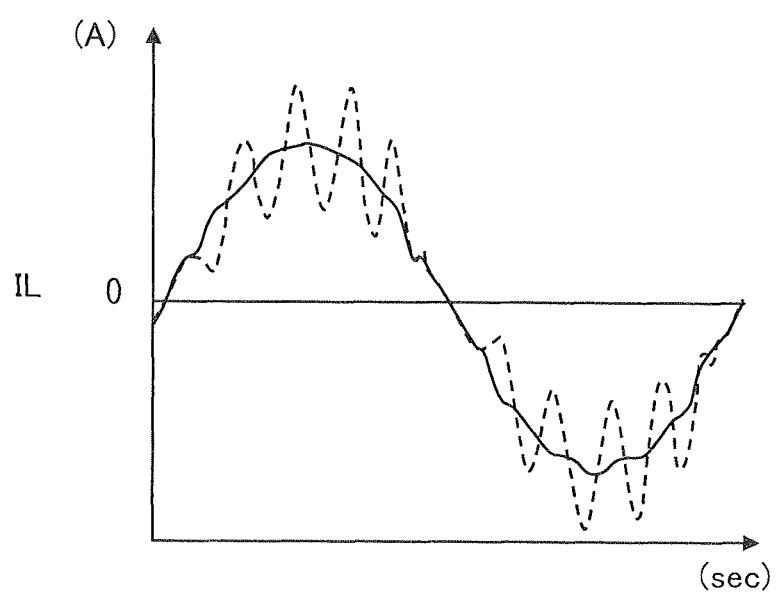
FIG. 24 is a diagram illustrating a waveform of a current flowing through a normal coil of the fourth embodiment.

FIG. 24 illustrates a waveform of the current IL of the normal coil L2. In FIG. 22, a broken line represents the power converter 1 having neither the CGR 245 nor the SWC1 344, and a solid line represents the power converter 1 according to the fourth embodiment. As can be seen from FIG. 22, according to the fourth embodiment, the amplitude of the resonance component in the current IL is reduced by the CGR 245, and the delay due to the resonance component in the current IL is reduced by the SWC1 344. Thus, the current IL flowing through the normal coil L2 is controlled to have a smooth waveform like a sine wave. Therefore, the harmonics can be much reduced.

Fifth Embodiment

Figure 25:
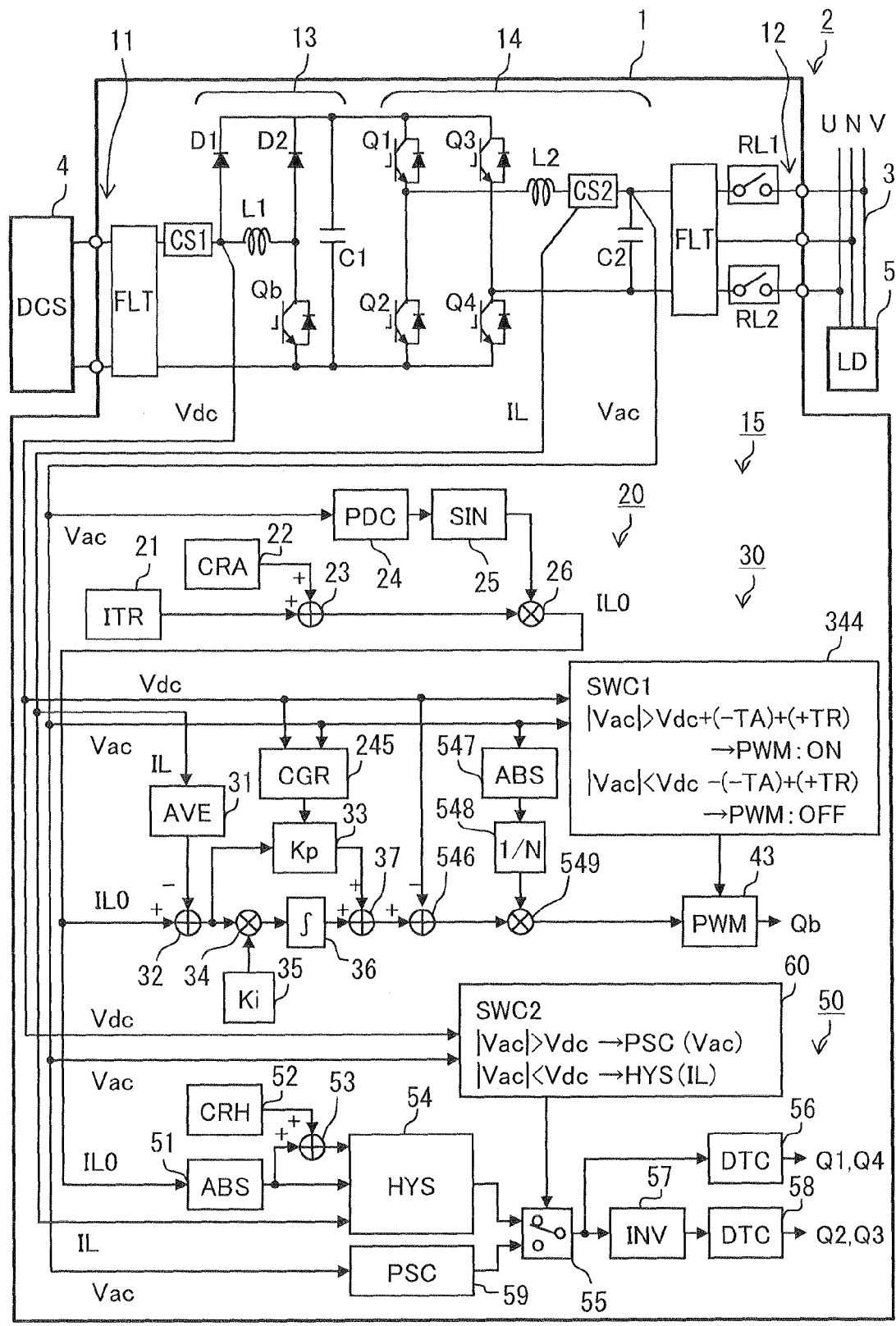
FIG. 25 is a block diagram of a power converter according to a fifth embodiment of the present invention.

FIG. 25 is a block diagram of a power converter 1 according to a fifth embodiment of the present invention. In the preceding embodiments, the modulation factor MR is calculated by the blocks 38-42.

In the blocks 38-42, when the output current is smaller than the instruction current value, the AC voltage Vac apparently corresponding to the output voltage Vout is increased so that the value (1−N) can approach 1. According the fifth embodiment, blocks 546-549 for approximately calculating the modulation factor MR are used instead of the blocks 38-42. The adder block 546 subtracts the DC voltage Vdc from the control value. The absolute-value block (ABS) 547 calculates an absolute value of the AC voltage Vac. The (1/N) block 548 the reciprocal of the AC voltage Vac. The multiplier block 549 multiplies the reciprocal of the instruction voltage value by the output of the adder block 546.

Thus, according to the fifth embodiment, when the output current is smaller than the instruction current value, the DC voltage Vdc apparently corresponding to the input voltage Vin is increased. Since the input voltage Vin is generally less than the output voltage Vout, the value Vin/Vout is controlled to approach 1.

Modifications

The above embodiments can be modified in various ways. For example, the switching elements can be elements other than IGBTs.

Such changes and modifications are to be understood as being within the scope of the present invention as defined by the appended claims.

What is claimed is:

1. A power converter comprising:
a booster circuit configured to boost DC power of a DC power source;
an inverter circuit configured to convert the DC power outputted from the booster circuit into AC power and output the AC power to a system;
a hysteresis control circuit configured to control the inverter circuit by hysteresis control so that the AC power is outputted to the system when an AC voltage of the system is less than a DC voltage of the power source; and
a proportional-integral control circuit configured to control the booster circuit by proportional-integral control so that the AC power is outputted to the system when the AC voltage of the system is larger than the DC voltage of the power source; wherein:
the inverter circuit includes a bridge circuit and a normal coil connected between the bridge circuit and the system;
the hysteresis control and the proportional-integral control are performed based on a current flowing through the normal coil; and
the power converter further comprises a control gain reduction circuit configured to reduce a control gain for a predetermined period from when the proportional-integral control circuit starts to control the booster circuit.

2. The power converter according to claim 1, wherein the control gain reduction circuit reduces the control gain over a resonance frequency between a capacitive component and an inductive component of the booster circuit.

3. The power converter according to claim 1, further comprising: a prevention circuit configured to prevent the booster circuit to boost the DC power when the AC voltage is less than the DC voltage.

4. The power converter according to claim 1, further comprising:
a polarity control circuit configured to cause the inverter circuit to convert the DC power boosted by the booster circuit into the AC power when the AC voltage is larger than the DC voltage.

5. The power converter according to claim 1, wherein the proportional-integral control circuit includes an average value calculator configured to calculate a moving average of the current flowing through the normal coil and performs the proportional-integral control of the booster circuit based on the moving average.

6. A power converter comprising:
a booster circuit configured to boost DC power of a DC power source;
an inverter circuit configured to convert the DC power outputted from the booster circuit into AC power and output the AC power to a system;
a hysteresis control circuit configured to control the inverter circuit by hysteresis control so that the AC power is outputted to the system when an AC voltage of the system is less than a DC voltage of the power source;
a proportional-integral control circuit configured to control the booster circuit by proportional-integral control so that the AC power is outputted to the system when the AC voltage of the system is larger than the DC voltage of the power source; wherein:
the inverter circuit includes a bridge circuit and a normal coil connected between the bridge circuit and the system;
the hysteresis control and the proportional-integral control are performed based on a current flowing through the normal coil; and
the power converter further comprises: a delay circuit configured to stop the proportional-integral control of the booster circuit a predetermined delay time after the AC voltage decreases below the DC voltage.

7. A power converter comprising:
a booster circuit configured to boost DC power of a DC power source;
an inverter circuit configured to convert the DC power outputted from the booster circuit into AC power and output the AC power to a system;
a hysteresis control circuit configured to control the inverter circuit by hysteresis control so that the AC power is outputted to the system when an AC voltage of the system is less than a DC voltage of the power source;
a proportional-integral control circuit configured to control the booster circuit by proportional-integral control so that the AC power is outputted to the system when the AC voltage of the system is larger than the DC voltage of the power source: wherein:
the inverter circuit includes a bridge circuit and a normal coil connected between the bridge circuit and the system;
the hysteresis control and the proportional-integral control are performed based on a current flowing through the normal coil; and
the power converter further comprises: an advance circuit configured to start the proportional-integral control of the booster circuit a predetermined advance time before the AC voltage increases above the DC voltage.

8. The power converter according to claim 7, wherein the advance time is equal to or larger than one-tenth of a resonance frequency between a capacitive component and an inductive component of the booster circuit and equal to or less than the resonance frequency.

* * * * *